(12) United States Patent
Johnson et al.

(10) Patent No.: US 8,590,944 B2
(45) Date of Patent: Nov. 26, 2013

(54) BAND CLAMP HAVING RADIAL ALIGNMENT FEATURE

(75) Inventors: Timothy J. Johnson, Auburn Hills, MI (US); Marc Friedrich, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/916,826

(22) Filed: Nov. 1, 2010

(65) Prior Publication Data

US 2011/0254268 A1   Oct. 20, 2011

Related U.S. Application Data

(60) Provisional application No. 61/324,466, filed on Apr. 15, 2010.

(51) Int. Cl.
*F16L 17/00* (2006.01)

(52) U.S. Cl.
USPC .......................................... 285/365; 285/367

(58) Field of Classification Search
USPC ............ 285/420, 407, 365, 366, 367; 24/279, 24/280, 282, 284, 285
See application file for complete search history.

(56) References Cited

U.S. PATENT DOCUMENTS

| | | | | |
|---|---|---|---|---|
| 2,426,423 A | * | 8/1947 | Woolsey | 285/233 |
| 2,460,984 A | * | 2/1949 | Hill et al. | 285/233 |
| 3,016,249 A | * | 1/1962 | Contreras et al. | 285/336 |
| 3,042,430 A | * | 7/1962 | Guy | 285/365 |
| 3,600,770 A | * | 8/1971 | Halling | 24/279 |
| 3,637,223 A | * | 1/1972 | Weber | 277/608 |
| 3,661,409 A | * | 5/1972 | Brown et al. | 285/82 |
| 3,797,836 A | * | 3/1974 | Halling | 285/367 |
| 4,185,858 A | * | 1/1980 | Peash | 285/367 |
| 4,225,160 A | * | 9/1980 | Ortloff | 285/123.2 |
| 4,660,869 A | * | 4/1987 | Gabus | 285/365 |
| 4,919,453 A | * | 4/1990 | Halling et al. | 285/3 |
| 5,411,162 A | * | 5/1995 | Koziczkowski et al. | 24/279 |
| 5,645,303 A | * | 7/1997 | Warehime et al. | 285/409 |
| 6,030,005 A | * | 2/2000 | Andersson et al. | 285/367 |
| 6,062,610 A | * | 5/2000 | Andersson et al. | 285/367 |
| 6,073,969 A | * | 6/2000 | Zimmerly | 285/12 |
| 6,109,665 A | * | 8/2000 | Meinig | 285/405 |
| 6,234,545 B1 | * | 5/2001 | Babuder et al. | 285/364 |
| 6,439,619 B1 | * | 8/2002 | Storage et al. | 285/330 |
| 7,004,512 B2 | * | 2/2006 | Antonelli et al. | 285/365 |
| 7,396,052 B2 | * | 7/2008 | Johnson, Jr. | 285/365 |

FOREIGN PATENT DOCUMENTS

CN   201129570   10/2008

OTHER PUBLICATIONS

Notice of Rejection in corresponding CN Case No. 201110095007.2; dated Jun. 20, 2013; 7 pgs.

* cited by examiner

*Primary Examiner* — Aaron Dunwoody
(74) *Attorney, Agent, or Firm* — Cantor Colburn LLP

(57) ABSTRACT

A band type clamp for securing together first and second pipe sections each having outwardly projecting flanges with opposing flange faces that extend about the circumference thereof is described. The band type clamp includes a conforming material disposed between the band type clamp and the outwardly projecting flanges and is configured to engage the outwardly projecting flanges and to exert an inwardly directed radial force thereon when the band type clamp is tightened from a first un-tightened position to a second tightened position and to radially pilot the outer surfaces and the first and second pipe sections relative to each other and the corresponding centerlines thereof.

8 Claims, 5 Drawing Sheets

US 8,590,944 B2

BAND CLAMP HAVING RADIAL ALIGNMENT FEATURE

CROSS-REFERENCES TO RELATED APPLICATIONS

This patent application claims priority to U.S. Provisional Patent Application Ser. No. 61/324,466 filed Apr. 15, 2010 which is hereby incorporated herein by reference in its entirety.

FIELD OF THE INVENTION

Exemplary embodiments of the present invention relate to band type clamps for coupling abutting flanges on the end of tube sections and, more specifically, to band type clamps having a radial alignment feature for piloting the centerlines of the abutting flanges.

BACKGROUND

The use of radially constricting band clamps and coupling devices for joining tube sections together is common. In automotive applications, such clamps may be utilized to connect cooling hoses to an engine or radiator, for instance. Applications that experience higher pressures and flows, such as pressurized or boosted engine intake systems that receive compressed intake air from an exhaust driven turbocharger or supercharger may require specialized band clamps such as V-band type clamps for connecting the abutting flanges on the ends of the turbocharger compressor inlet and the engine intake runner, for example, and on mating pipe ends in general. When tightened, the V-band type clamps apply a wedging action including an axial force component that axially draws the flanges into sealing contact with each other, or with an interposed gasket.

The application just described requires precise alignment of the inner diameters of the turbocharger compressor inlet and the engine intake runner in order to avoid flow disruption at the joint interface. Such a misalignment may cause a reduction in fluid flow through the joint resulting in reduced turbocharger efficiency as well as unwanted intake system noise. Alignment tabs and corresponding receiving slots are one solution to the radial alignment problem. The aforementioned solutions may result in lower than expected performance due to the placement of the tabs in the flow stream as well as tolerance stack-up issues in the castings that may allow for some degree of joint misalignment.

Accordingly, it is desirable to provide for less intrusive axial alignment of such joints.

SUMMARY OF THE INVENTION

In an exemplary embodiment a V-band type clamp for securing together first and second pipe sections each having outwardly projecting flanges with opposing flange faces that extend about the circumference thereof is described. The V-band type clamp comprises a strap having a first end and a second end, a trunion joint in communication with the first end and the second end and configured to connect the ends into a circumferentially extending assembly that may be tightened, an inner V-band in communication with the outer strap and extending substantially from the first end to the second end. The V-band comprises an internal, circumferentially extending wall adjacent to and extending along the strap, frusto-conical side walls extending from the circumferentially extending wall and configured to engage remote faces of the outwardly projecting flanges and to exert opposed axial forces on the outwardly projecting flanges when the circumferentially extending assembly is tightened, and a conforming material disposed on the internal, circumferentially extending wall and configured to engage outer surfaces of the outwardly projecting flanges and to exert a inwardly directed radial force thereon when the circumferentially extending assembly is tightened and to pilot the surfaces and the first and second pipe sections relative to each other.

In another exemplary embodiment a V-band type clamp for securing together first and second pipe sections each having outwardly projecting flanges with opposing flange faces that extend about the circumference thereof is described. The V-band type clamp comprises a conforming material disposed between the V-band type clamp and the outwardly projecting flanges and configured to engage the outwardly projecting flanges and to exert an inwardly directed radial force thereon when the V-band type clamp is tightened and to pilot the first and second pipe sections relative to each other.

A band type clamp for securing together first and second pipe sections each having outwardly projecting flanges with opposing flange faces that extend about the circumference thereof by applying opposed axial forces thereon comprises a conforming material disposed between the band type clamp and the outwardly projecting flanges and configured to engage the outwardly projecting flanges and to exert an inwardly directed radial force thereon when the band type clamp is tightened, to thereby pilot the first and second pipe sections relative to each other.

The above features and advantages, and other features and advantages of the present invention are readily apparent from the following detailed description of the invention when taken in connection with the accompanying drawings.

BRIEF DESCRIPTION OF THE DRAWINGS

Other features, advantages and details appear, by way of example only, in the following detailed description of the embodiments, the detailed description referring to the drawings in which.

DESCRIPTION OF THE EMBODIMENTS

Figure 1:
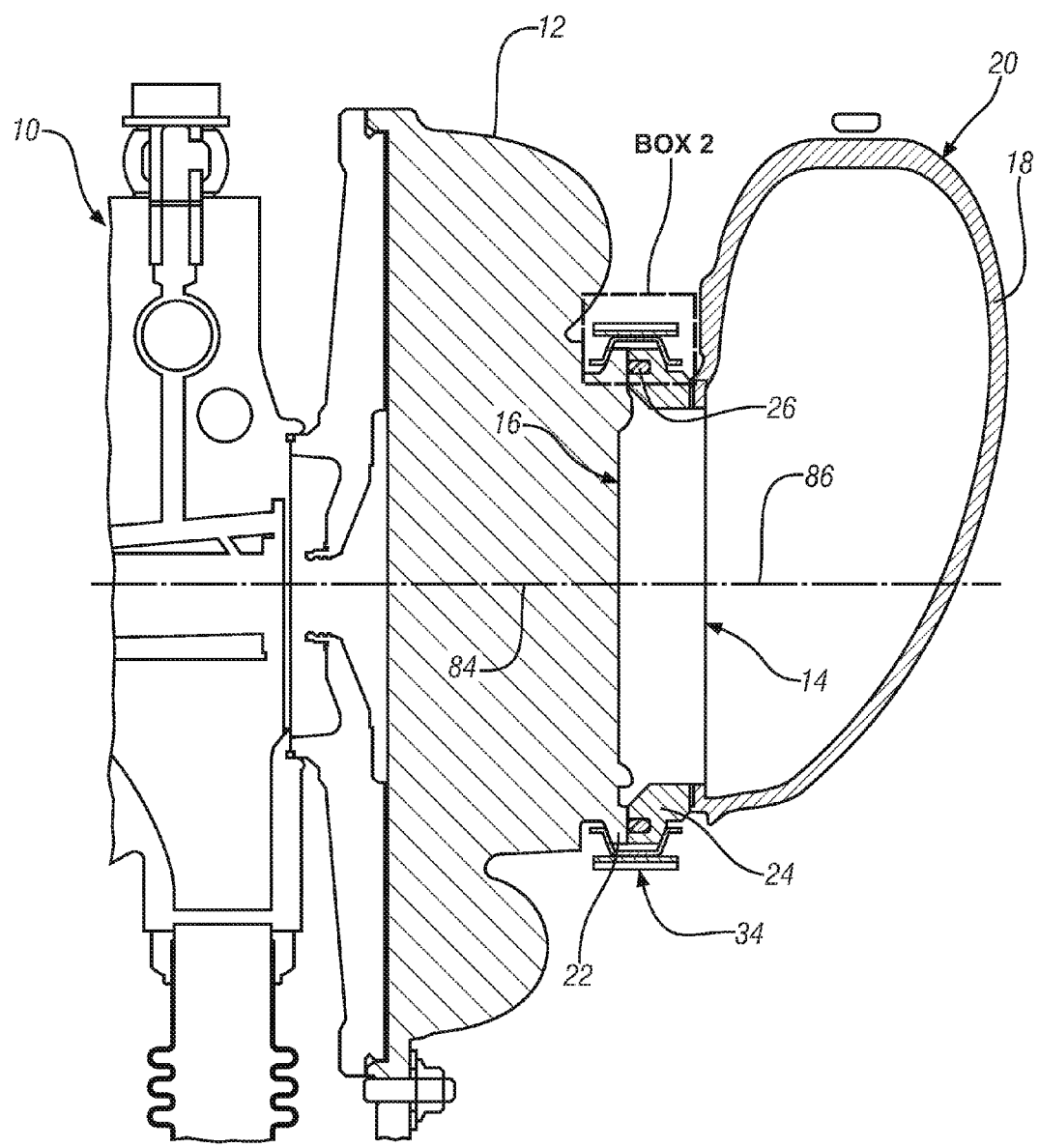
FIG. 1 is a sectional view of a joint between a turbocharger compressor inlet and an intake runner or conduit for an internal combustion engine embodying features of the invention.

The following description is merely exemplary in nature and is not intended to limit the present disclosure, application or uses. It should be understood that throughout the drawings, corresponding reference numerals indicate like or corresponding parts and features.

Figure 2:
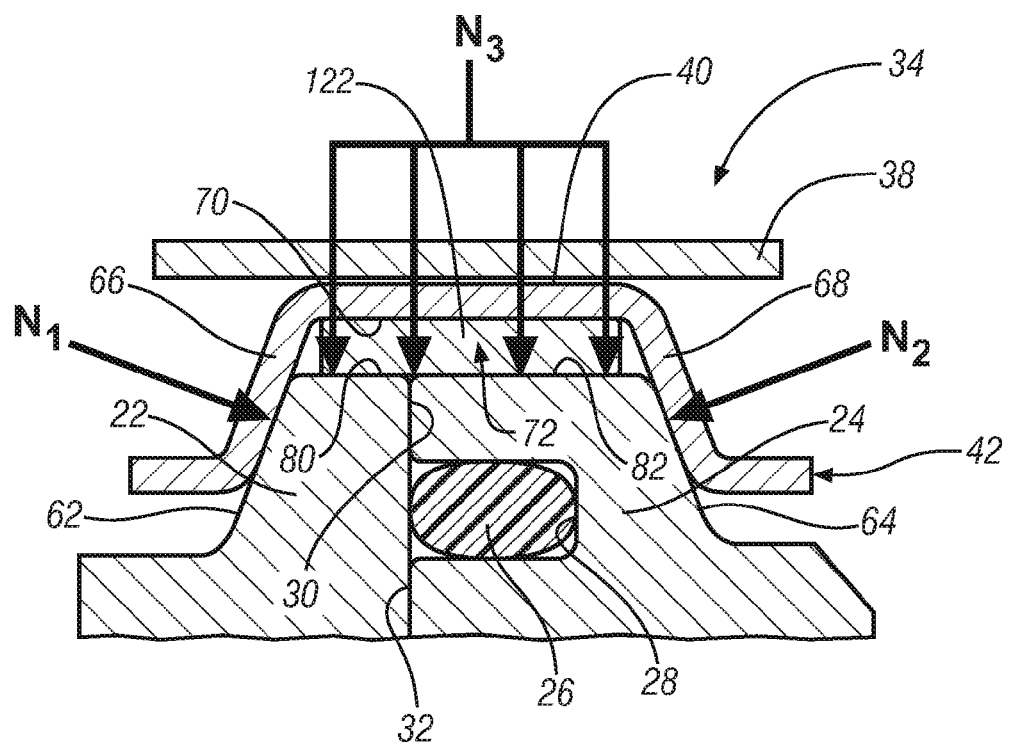
FIG. 2 is an enlarged view of the joint of FIG. 1 taken at Box 2.

The present invention is directed to an improved band type clamp for sealingly joining and axially aligning two pipe ends. Referring now to FIG. 1, in an exemplary embodiment of such a band type clamp, an exhaust driven turbocharger 10 for an internal combustion engine (not shown) comprises a compressor housing 12 having a first pipe section (in the embodiment shown, a compressor inlet 14) configured for sealing engagement with a second pipe section (in the embodiment shown, an outlet 16 of an intake runner or conduit 18 of an engine intake system 20). The compressor housing 12 receives ambient air through the intake runner 18 and compresses the air prior to delivering it to the engine for combustion with fuel. Referring to FIGS. 1 and 2, in an exemplary embodiment, the compressor inlet 14 and the outlet 16 of the intake runner 18 approximate first and second pipe sections, each having outwardly projecting flanges 22 and 24 that extend about the circumference thereof. A circumferentially extending seal member 26 may be disposed in a receiving slot 28 in one of the abutting flange faces 30 or 32. When the flange faces 30, 32 are drawn axially together, the seal member 26 prevents leakage of air into, or out of the intake system 20.

Figure 6:
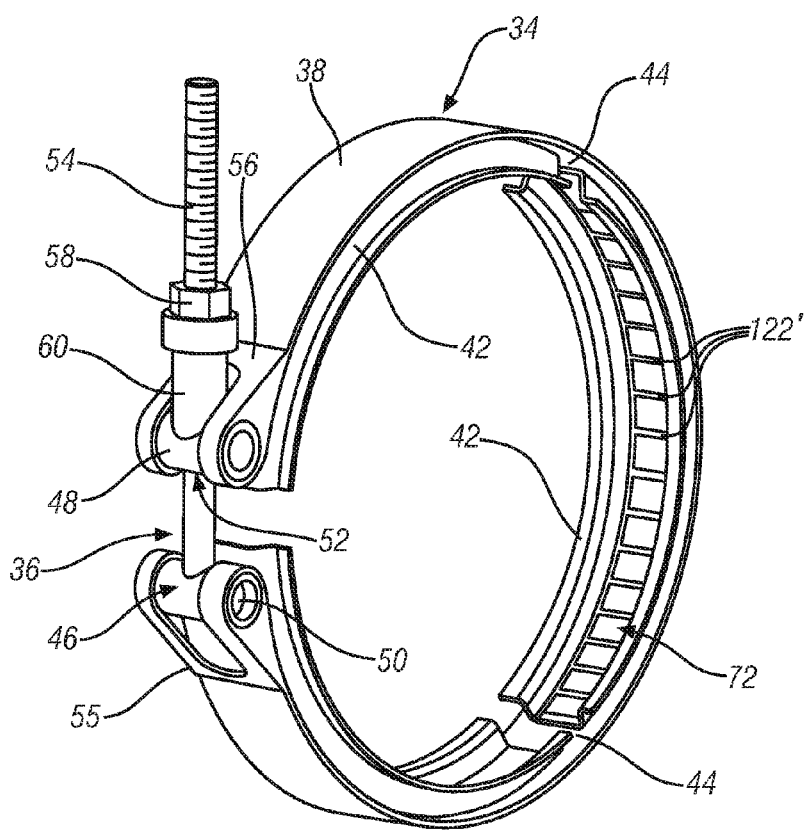
FIG. 6 is a perspective view of a V-band type clamp embodying features of the invention.
Figure 7:
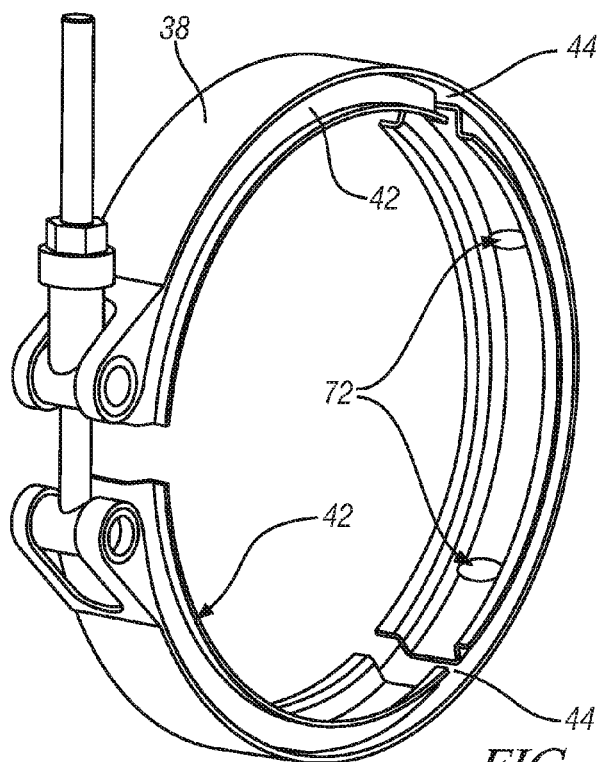
FIG. 7 is a perspective view of a V-band type clamp embodying features of another embodiment of the invention.

Referring to FIGS. 1, 2 and 6, in an exemplary embodiment, a band type clamp or coupling 34 (in this non-limiting application, a V-band type clamp is used for illustration) having a unitary construction and featuring a single trunion joint 36 is shown. V-band type clamps may also be non-unitary and include multiple trunion joints and such constructions are contemplated to fall within the scope of the invention. Other clamps that apply an axial sealing load to seal first and second pipe sections are also contemplated to fall within the scope of the invention. The V-band type clamp 34 includes a strap 38 extending circumferentially about the outside surface 40 of a V-band 42. The strap 38 and the V-band 42 may be constructed of metal or other flexible material that is suitable for the particular application of the clamp. In the embodiment shown, the V-band 42 may comprise a plurality of segments having gaps 44 that allow for some circumferential compression of the V-band without buckling. The ends of the strap 38 are connected to the trunion joint 36 by folding the ends over pin assemblies 46 and 48 and being welded or otherwise fastened onto themselves. The head 50 of a T-bolt 52 is disposed in pin assembly 46 and includes a shaft 54 which extends between a first end 55 and a second end 56 of the strap 38. A tightening mechanism such as nut 58 threads onto the shaft 54 of the T-bolt 52 and engages a retainer 60 that is attached to pin assembly 48. In operation, the head 50 of the T-bolt 52 engages the pin assembly 46 while the tightening nut 58 engages the retainer 60 such that the T-bolt connects the strap ends 54, 56 together in a circumferentially extending assembly which may be tightened by turning the nut 58.

In an exemplary embodiment and referring again to FIGS. 1 and 2, the outwardly projecting flanges 22 and 24 of the compressor inlet 14 and the outlet 16 of the intake runner 18 comprise inclined remote faces 62, 64 which mirror the divergence of the side walls 66 and 68 of the V-band 42 (in this example, frusto-conical). As the nut 58, FIG. 6, is tightened from a first un-tightened position to a second tightened position, engagement of the side walls 66 and 68 with the inclined remote faces 62, 64 will apply partially radially compressive forces $N_1$ and $N_2$ which include opposed axial force components operable on the outwardly projecting flanges 22 and 24 to thereby draw the flanges axially together into compressive engagement and to seal the joint between the compressor inlet 14 and the outlet 16 of the intake runner 18.

Figure 3:
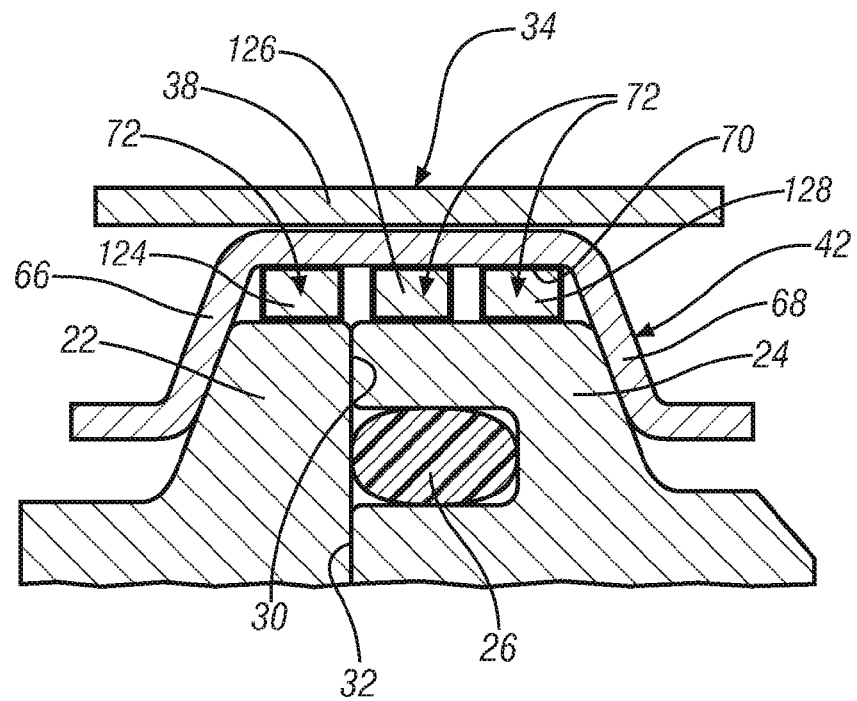
FIG. 3 illustrates another embodiment of the invention.
Figure 4:
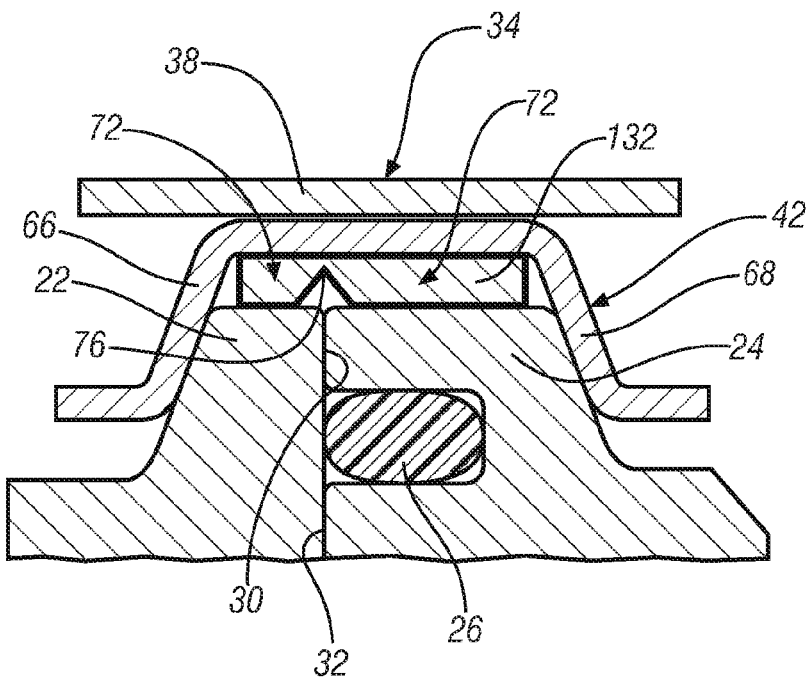
FIG. 4 illustrates another embodiment of the invention.
Figure 5:
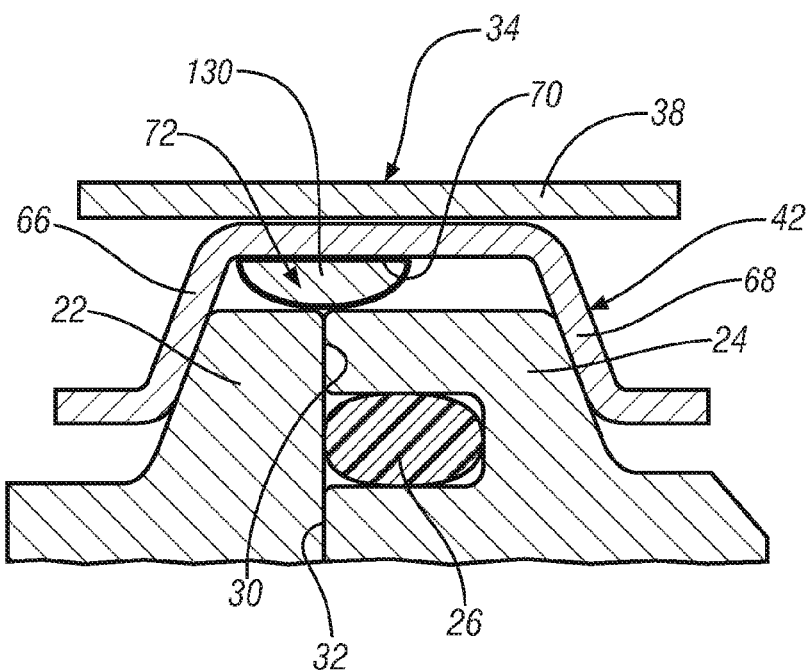
FIG. 5 illustrates another embodiment of the invention.
Figure 8:
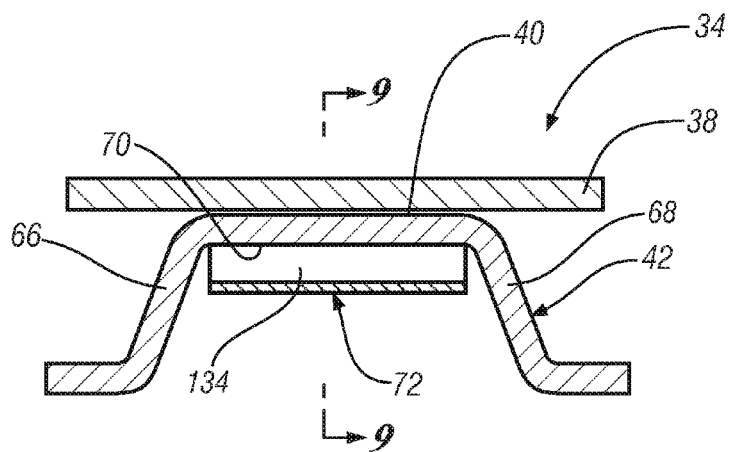
FIG. 8 illustrates yet another embodiment of the invention.
Figure 9:
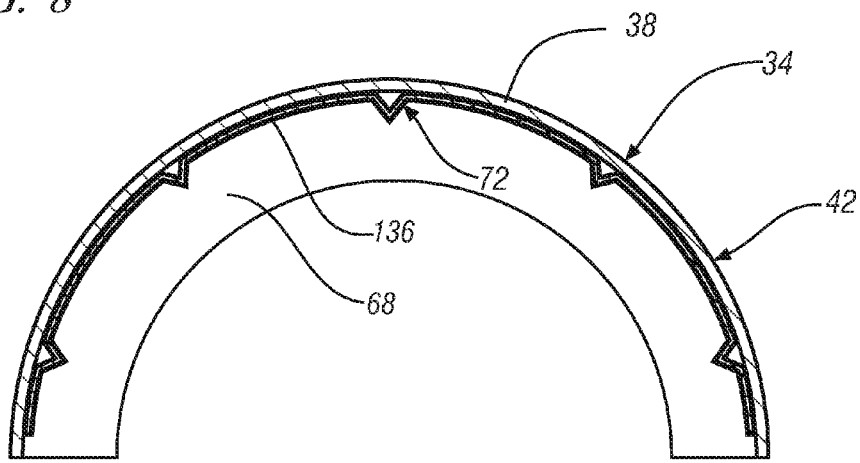
FIG. 9 illustrates the embodiment of FIG. 8 taken along line 8-8.
Figure 10:
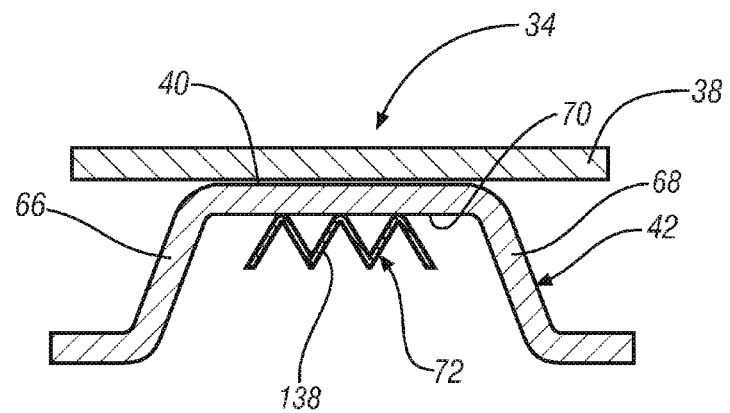
FIG. 10 illustrates still yet another embodiment of the invention.

In an exemplary embodiment, an internal circumferential wall 70 of the V-band type clamp 34 extends between and supports the side walls 66 and 68. The internal circumferential wall 70 also extends substantially the entire length of the strap 38. Disposed along at least a portion of the internal circumferential wall 70 is a conforming material 72. The conforming material may be soft, semi-rigid, or near-rigid, depending upon the particular application of the V-band type clamp 34 and may comprise rubber, urethane, layered metal, corrugated metal or spring steel defining a spring-like member, RTV silicon, foam (metal or non-metal), Nylon, vermiculite, expanded graphite, or other suitable material. In addition, the conforming material 72 may be applied as a single strip 122 as illustrated in FIG. 2, or multiple circumferentially spaced nubs 122' as illustrated in FIG. 6. Alternately, as illustrated in FIG. 3, patches 124, 126 and 128 extending circumferentially or partially circumferentially may be used. In another non-limiting embodiment, beads 130 may serve as conforming material 72 as illustrated in FIG. 5. In yet another alternative embodiment, sculpted strips 132 having various features may be used. Sculpted stripe 132 may include various features to enhance compliance under compression. As illustrated in FIG. 4, a notch 76 is used. In yet another embodiment, corrugated steel strips 136 or 138, illustrated in FIGS. 8, 9 and 10 may be welded to the inner circumferential wall 70 of the V-band 42 along the length thereof or at intervals along the length thereof, depending on the orientation of the steel strips 136 or 138.

Referring again to FIG. 2, as the nut 58 is tightened, from the first un-tightened position to the second tightened position, the internal circumferentially extending wall 70 and the conforming material 72 moves radially inwardly towards the circumferentially extending outer surfaces 80 and 82 of the outwardly projecting flanges 22 and 24 extending about the circumference of the compressor inlet 14 and the outlet 16 of the intake runner 18, respectively. The conforming material 72 allows the V-band clamp to exert a radially inwardly directed force $N_3$ as illustrated in FIG. 1, across the outer surfaces 80 and 82 and substantially about their relative circumferences. The result of the force $N_3$ is a piloting or alignment of the outer surfaces 80 and 82 of the outwardly projecting flanges 22 and 24 and, as a result, a corresponding alignment of the centerline 84 of the compressor inlet 14 with a centerline 86 of the outlet 16 of the intake runner 18. The thickness and the compressibility (durometer hardness) of the conforming material is selected and controlled in order to achieve the desired clamping load and centerline piloting accuracy at a calculated tightening torque of the nut 58.

While the invention has been illustrated as having application to the coupling of a compressor inlet 14 of an exhaust driven turbocharger 10 to an outlet 16 of an engine intake system 20, such specific application is for the purposes of illustration and the invention should not be considered as limited to that particular application. It is of course contemplated that the invention has application to other flanged couplings such as, for example, other turbocharger connections, exhaust system connections and, of course, non-automotive connections where a band type clamp or coupler has applicability.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. An assembly, comprising:
   first and second pipe sections, wherein the assembly is configured for radially positioning the first and second pipe sections relative to corresponding centerlines of the first and second pipe sections, the first and second pipe sections each having outwardly projecting flanges with opposing flange faces that extend about a circumference thereof;
   an outer strap having a first end and a second end;
   a trunion joint in communication with the first end and the second end and configured to connect the first and second ends into a circumferentially extending assembly having a first un-tightened position and a second tightened position;
   a circumferentially extending seal that is disposed in a receiving slot, the receiving slot being disposed in one of the opposing flange faces of the first and second pipe sections;
   an inner V-band in communication with the outer strap and extending substantially from the first end to the second end and comprising:
   an internal, circumferentially extending wall extending along the strap;
   frusto-conical side walls extending from the circumferentially extending wall and configured to engage a plurality of remote faces of the outwardly projecting flanges and to exert opposed axial forces on the outwardly projecting flanges when the circumferentially extending assembly is in the second, tightened position; and
   a conforming material disposed on the internal, circumferentially extending wall and configured to engage outer surfaces of the outwardly projecting flanges, the conforming material configured to allow the strap and the inner V-band to exert an inwardly directed radial force thereon when the circumferentially extending assembly is in the second tightened position and to radially pilot the outer surfaces and the first and second pipe sections relative to each other and the corresponding centerlines thereof, the conforming material having a thickness and a compressibility configured to achieve a selected clamping load and centerline piloting accuracy of the assembly, wherein the conforming material comprises circumferentially spaced nubs or patches located along the length of the inner V-band.

2. The assembly of claim 1, wherein the first and second pipe sections comprise a compressor inlet configured for sealing engagement with an inlet of an intake runner of an engine intake system.

3. The assembly of claim 1, wherein the conforming material comprises rubber, urethane, layered metal, RTV silicon, foam (metal or non-metal), Nylon, vermiculite, expanded graphite or a combination thereof.

4. An assembly, comprising:
   first and second pipe sections each having outwardly projecting flanges with opposing flange faces that extend about a circumference thereof;
   a circumferentially extending seal that is disposed in a receiving slot, the receiving slot being disposed in one of the opposing flange faces of the first and second pipe sections; and
   a conforming material disposed between a V-band clamp and the outwardly projecting flanges and configured to engage the outwardly projecting flanges, the conforming material configured to allow the V-band clamp to exert an inwardly directed radial force thereon when the V-band clamp is moved between a first un-tightened position and a second tightened position to radially pilot the outer surfaces and the first and second pipe sections relative to each other and corresponding centerlines of the first and second pipe sections thereof, the conforming material having a thickness and a compressibility configured to achieve a selected clamping load and centerline piloting accuracy of the assembly, wherein the conforming material comprises a strip having a notch formed therein such that the notch is located substantially over abutting flange faces of the first and second pipe sections.

5. The assembly of claim 4, wherein the first and second pipe sections comprise a compressor inlet configured for sealing engagement with an inlet of an intake runner of an engine intake system.

6. The assembly of claim 4, wherein the conforming material comprises rubber, urethane, layered metal, RTV, foam (metal or non-metal), Nylon, vermiculite or expanded graphite or a combination thereof.

7. The assembly of claim 4, wherein the conforming material comprises a single strip extending substantially the length only along an internal circumferential wall of the inner V-band.

8. An assembly, comprising:
   first and second pipe sections each having outwardly projecting flanges with opposing flange faces that extend about a circumference thereof by applying opposed axial forces thereon;
   a circumferentially extending seal that is disposed in a receiving slot, the receiving slot being disposed in one of the opposing flange faces of the first and second pipe sections; and
   a conforming material disposed between a band clamp and the outwardly projecting flanges and configured to engage the outwardly projecting flanges, the conforming material configured to allow the band clamp to exert an inwardly directed radial force thereon when the band clamp is tightened and to radially pilot the outer surfaces and the first and second pipe sections relative to each other and corresponding centerlines of the first and second pipe sections thereof, the conforming material having a thickness and a compressibility configured to achieve a selected clamping load and centerline piloting accuracy of the assembly, wherein the conforming material comprises corrugated strips or spring steel welded along the length, or at intervals along the length of the band clamp.

* * * * *